United States Patent
Lee et al.

(10) Patent No.: US 9,572,091 B2
(45) Date of Patent: Feb. 14, 2017

(54) METHOD AND ELECTRONIC DEVICE FOR NETWORK SEARCH

(71) Applicant: Samsung Electronics Co., Ltd., Gyeonggi-do (KR)

(72) Inventors: Sang-Hyun Lee, Gyeonggi-do (KR); Su-Young Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 14/204,954

(22) Filed: Mar. 11, 2014

(65) Prior Publication Data

US 2014/0256316 A1    Sep. 11, 2014

(30) Foreign Application Priority Data

Mar. 11, 2013 (KR) .................. 10-2013-0025560

(51) Int. Cl.
*H04W 48/16* (2009.01)
*H04W 48/18* (2009.01)

(52) U.S. Cl.
CPC ............. *H04W 48/16* (2013.01); *H04W 48/18* (2013.01)

(58) Field of Classification Search
CPC ....... H04W 24/00; H04W 48/16; H04W 48/18
See application file for complete search history.

(56) References Cited

U.S. PATENT DOCUMENTS

| | | | | |
|---|---|---|---|---|
| 2007/0042775 | A1* | 2/2007 | Umatt | H04W 48/16 455/434 |
| 2009/0323609 | A1* | 12/2009 | Walton | H04W 48/16 370/329 |
| 2011/0207473 | A1 | 8/2011 | Swaminathan et al. | |
| 2012/0302221 | A1* | 11/2012 | Nader | H04W 48/18 455/418 |
| 2013/0028119 | A1* | 1/2013 | Ben-Eli | H04W 48/16 370/252 |

* cited by examiner

*Primary Examiner* — Myron K Wyche

(57) ABSTRACT

A method and an electronic device for network search. The network search method in an electronic device includes scanning a frequency band corresponding to a first communication system to search for a first Public Land Mobile Network (PLMN); when discovering a second PLMN as a result of the scanning, determining whether a frequency band of the second PLMN and a frequency band of a second communication system overlap each other; and when the frequency band of the second PLMN and the frequency band of the second communication system overlap each other, scanning the other frequency band excluding the overlapping frequency band in the entire frequency band corresponding to the second communication system to search for the first PLMN.

20 Claims, 8 Drawing Sheets

RPLMN : B PLMN
DEVICE SUPPORT BANDS: LTE(900M~1GHz),
                      WCDMA(2.025G~2.45GHz),
                      GSM(890M~940MHz)

LTE : A PLMN,        WCDMA : A PLMN,   GSM : A PLMN,
905MHz~950MHz        2.3GHz~2.4GHz     880MHz~895MHz

FIG.4

METHOD AND ELECTRONIC DEVICE FOR NETWORK SEARCH

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 11, 2013, and assigned Serial No. 10-2013-0025560, the entire disclosure of which is hereby incorporated by reference.

TECHNICAL FIELD

The present disclosure relates generally to an electronic device. More particularly, the present disclosure relates to a method and an apparatus for searching for a Public Land Mobile Network (PLMN) in an electronic device.

BACKGROUND

As electronic devices such as smart phone and tablet Personal Computer (PC) rapidly advance, the electronic device allowing wireless voice call and information exchange becomes necessary for daily life. When first introduced, the electronic device provided the features of portability and wireless communication. As technology has advanced and wireless Internet is introduced, advanced portable terminals are now provided as multimedia devices supporting functions such as schedule management, games, remote control, image capturing, and projector, to thus meet user's demands.

In particular, as various communication systems are provided recently, the electronic device supports various communication systems. For example, a mobile electronic device supports at least two communication systems such as Long Term Evolution (LTE) and Wideband Code Division Multiple Access (WCDMA). For the wireless communication, the electronic device needs to search for an accessible Public Land Mobile Network (PLMN) by scanning a frequency band corresponding to the communication system. The short scanning time of the frequency band allows the rapid communication.

However, the related art scans the whole frequency band supported by the electronic device based on the communication system. As a result, as the number of the communication systems increases, the frequency band scan time for the PLMN search also increases.

In this regard, what is needed is a method for shortening the frequency band scan time in the electronic device supporting the plurality of the communication systems.

SUMMARY

To address the above-discussed deficiencies, it is a primary aspect of the present disclosure to provide a scanning method and an apparatus for searching for a PLMN in an electronic device.

Another aspect of the present disclosure is to provide a method and an apparatus for selectively scanning a frequency band corresponding to a second communication system using a frequency band scan result corresponding to a first communication system when an electronic device supporting a plurality of communication systems scans the frequency band.

Yet another aspect of the present disclosure is to provide a method and an apparatus for scanning other frequency band excluding a frequency band of a second PLMN in a frequency band corresponding to a second communication system when an electronic device discovers the second PLMN in a frequency band corresponding to a first communication system during the scanning to discover a first PLMN.

According to one aspect of the present disclosure, a Public Land Mobile Network (PLMN) search method in an electronic device includes scanning a frequency band corresponding to a first communication system to search for a first PLMN; when discovering a second PLMN as a result of the scanning, determining whether a frequency band of the second PLMN and a frequency band of a second communication system overlap each other; and when the frequency band of the second PLMN and the frequency band of the second communication system overlap each other, scanning the other frequency band excluding the overlapping frequency band in the entire frequency band corresponding to the second communication system to search for the first PLMN.

According to another aspect of the present disclosure, an electronic device for PLMN search includes one or more processors; a touch-sensitive display; two or more communication systems; a memory; and one or more programs stored in the memory and configured for execution by the two or more processors. The program includes instructions for scanning a frequency band corresponding to a first communication system to search for a first PLMN, when discovering a second PLMN as a result of the scanning, determining whether a frequency band of the second PLMN and a frequency band of a second communication system overlap each other, and when the frequency band of the second PLMN and the frequency band of the second communication system overlap each other, scanning the other frequency band excluding the overlapping frequency band in the entire frequency band corresponding to the second communication system to search for the first PLMN.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a diagram of the frequency band scanning per communication system to search for the PLMN in the electronic device according to an exemplary embodiment of the present disclosure.

Throughout the drawings, like reference numerals will be understood to refer to like parts, components and structures.

DETAILED DESCRIPTION

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an electronic device embraces a mobile communication terminal, a smart phone, a tablet Personal Computer (PC), a digital camera, an MP3 player, a navigation system, a laptop, a netbook, and a computer, supporting two or more communication systems.

Figure 1A:
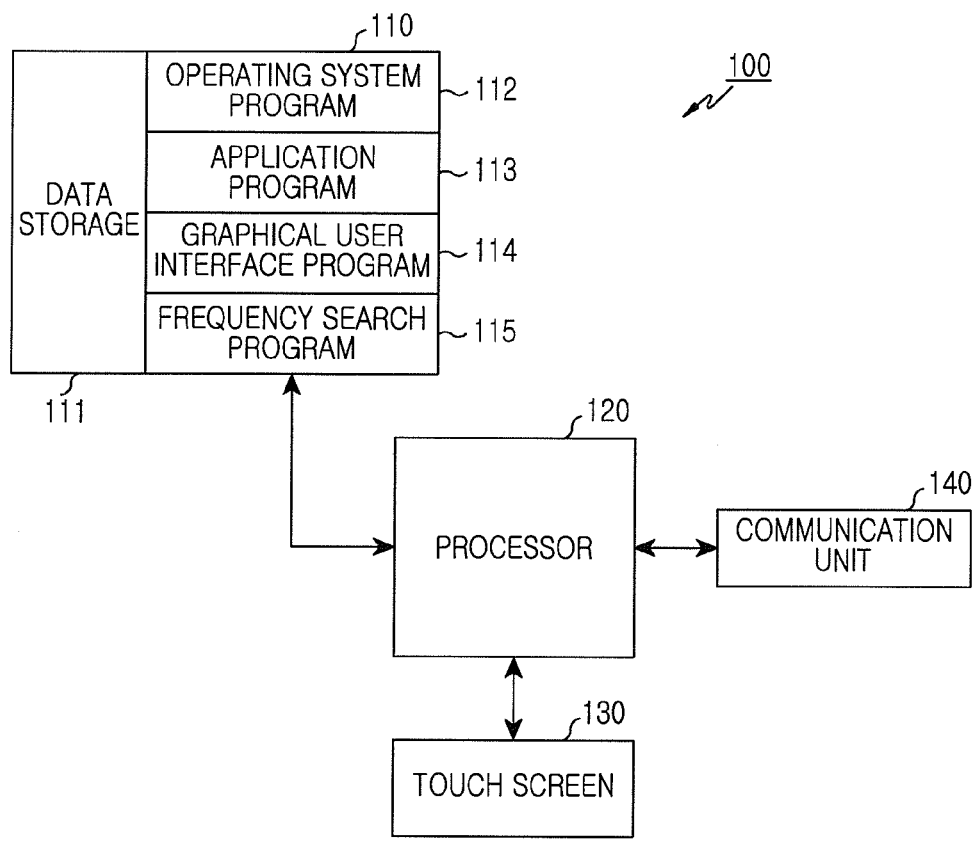
FIG. 1A illustrates a block diagram of an electronic device for searching for a PLMN according to an exemplary embodiment of the present disclosure.

FIG. 1A illustrates a block diagram of an electronic device for searching for a Public Land Mobile Network (PLMN) according to an exemplary embodiment of the present disclosure.

Referring to FIG. 1A, the electronic device 100 includes a memory 110, a processor 120, a touch screen 130, and a communication unit 140. A plurality of memories 110 and a plurality of processors 120 can be equipped.

The memory 110 includes a data storage 111, an operating system program 112, an application program 113, a graphical user interface program 114, and a frequency search program 115. The program being a software component can be represented as a set of instructions. Hence, the program may be referred to as an instruction set. The program may be also referred to as a module.

The memory 110 can store one or more programs including instructions for realizing exemplary embodiments of the present disclosure.

The data storage 111 stores data generating in the function execution corresponding to the program stored in the memory 110. In the PLMN search, the data storage 111 can store frequency band information of the discovered PLMN. For example, the data storage 111 can store information indicating that the frequency band of a first PLMN discovered is 905 MHz~950 MHz.

Further, the data storage 111 can store PLMN search results based on a communication system. For example, the data storage 111 can store information indicating that the first PLMN is discovered in a frequency band 2.3 GHz~2.4 GHz of a first communication system. The data storage 111 can store information indicating that the first PLMN is discovered in the frequency band 2.3 GHz~2.4 GHz of the first communication system and the first PLMN is discovered in a frequency band 880 MHz~895 MHz of a second communication system. The communication system can include at least one of Long Term Evolution (LTE), Wideband Code Division Multiple Access (WCDMA), and Global System for Mobile Communications (GSM).

The data storage 111 can store the frequency band per communication system. For example, the data storage 111 can store information indicating that the frequency band of the LTE is 900 MHz~1 GHz, the frequency band of the WCDMA is 2.25 GHz~2.45 GHz, and the frequency band of the GSM is 890 MHz~940 MHz.

The operating system program 112 (e.g., the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system program 112 processes normal communication between various hardware (devices) and software components (programs).

The application program 113 includes applications such as browser, e-mail, message, word processing, address book, widget, Digital Right Management (DRM), voice recognition, voice reproduction, position determining function, location based service, call, schedule management, and task management.

The graphical user interface program 114 includes at least one software component for providing a user interface using graphics between a user and the electronic device 100. That is, the graphical user interface program 114 includes at least one software component for displaying user interface information on the touch screen 130. The graphical user interface program 114 can display information indicating that the PLMN is discovered. When the PLMN is scanned and discovered, the graphical user interface program 114 can display information of the communication system of the discovered PLMN. The graphical user interface program 114 can display the communication system information in various forms such as popup message or icon. For example, the graphical user interface program 114 can display a popup message notifying that the PLMN is discovered in the frequency band of the LTE system and the access to the LTE system is completed.

When an event for the communication access is detected, the frequency search program 115 scans the frequency bands of the communication systems to search for the PLMN. That is, the frequency search program 115 scans the frequency bands corresponding to the communication systems for the communication access and determines whether the available PLMN is detected. For example, the frequency search program 115 determines whether the available PLMN is detected by scanning the frequency band (900 MHz~1 GHz) of the LTE for the communication access. For example, the frequency search program 115 determines whether the available PLMN is detected by scanning the frequency band (2.25 GHz~2.45 GHz) of the WCDMA for the communication access. For example, the frequency search program 115 determines whether the available PLMN is detected by scanning the frequency band (890 MHz~940 MHz) of the GSM for the communication access. In so doing, based on a priority of the communication system, the frequency search program 115 can sequentially scan the frequency bands from the high-priority communication system. The priority of the communication system can be preset at the design phase or determined and changed according user setup. The priority of the communication system can be set and changed at the time of the access to the electronic device. For example, the highest priority can be given to the communication system most recently accessed by the electronic device.

When the communication access event is detected, the frequency search program 115 first searches for the PLMN most recently accessed by the electronic device 100, that is, a Registered PLMN (RPLMN). For example, when the communication access event is detected, the frequency search program 115 confirms that the PLMN most recently accessed by the electronic device is the first PLMN and searches for the first PLMN by sequentially scanning the frequency bands of the communication systems according to the priority.

The frequency search program 115 scan the frequency band of the first communication system to search for the first PLMN, and determines the frequency band to scan in the second communication system according to the frequency band scan result of the first communication system.

When the frequency band of the first communication system is scanned to search for the first PLMN and the first PLMN is discovered, the frequency search program 115 can access the communication. By contrast, when the frequency band of the first communication system is scanned to search for the first PLMN and the first PLMN is not discovered, the frequency search program 115 can scan the frequency band of the second communication system according to the priority of the communication systems. When the frequency band of the first communication system is scanned and the second PLMN is discovered instead of the first PLMN, the frequency search program 115 continues searching for the first PLMN in the other frequency band excluding the frequency band of the second PLMN discovered in the frequency band of the second communication system. Next, when the first PLMN is not discovered in the frequency band of the second communication system, the frequency search program 115 repeats the above process. For example, when the frequency band (900 MHz~1 GHz) of the LTE is scanned to search for the first PLMN and the second PLMN is discovered in the frequency band 900 MHz~920 GHz, the frequency search program 115 continues searching for the first PLMN in the other frequency band excluding the frequency band (900 MHz~920 MHz) of the second PLMN discovered in the frequency band (890 MHz~940 GHz) of the GSM. Herein, when the frequency band of the first communication system is scanned to search for the first PLMN and the second PLMN is discovered, the frequency search program 115 excludes the frequency band of the second PLMN as scanning the frequency band of the second communication system in order to reduce the total scanning time by considering that different PLMNs do not use the same frequency band.

The processor 120 can include at least one processor (not shown) and a peripheral interface (not shown). The processor 120 executes a particular program (instruction set) stored in the memory 110 and conducts particular functions corresponding to the program.

The touch screen 130 is a touch-sensitive display and provides an interface for the touch input/output between the electronic device 100 and the user. The touch screen 130 is a medium for detecting the touch (or the contact) through a touch sensor (not shown), sending the detected touch input to the electronic device 100, and providing a visual output of the electronic device 100 to the user. That is, in response to the touch input, the touch screen 130 provides the visual output to the user based on text, graphics, and video.

The touch screen 130 includes a touch-sensitive surface for detecting the user's touch input, and senses the user touch input using haptic contact, tactile contact, or their combination. For example, the detected touch point of the touch screen 130 corresponds to a digit of the finger used to contact the touch-sensitive surface. On the touch-sensitive surface, the touch screen 130 detects the contact of an external device such as stylus pen. The detected contact is converted to an interaction corresponding to the user interface (e.g., a soft key) displayed on the touch screen 130.

The touch screen 130 provides an interface for the touch input/output between the electronic device 100 and the user. Namely, the touch screen 130 is a medium for sending the user's touch input to the electronic device 100 and representing the visual output of the electronic device 100 to the user. The touch screen 130 can adopt various display technologies such as Liquid Crystal Display (LCD), Light Emitting Diode (LED), Light emitting Polymer Display (LPD), Organic LED (OLED), Active Matrix OLED (AMOLED) or Flexible LED (FLED). The touch screen 130 is not limited to the touch screen using those display technologies. The touch screen 130 can detect the contact start, the contact movement, or the contact abortion or end on the touch-sensitive surface using, but not limited to, various touch detection (sensing) techniques such as capacitive, resistive, infrared or surface sound wave detections. The touch screen 130 can display information indicating the scanning in process for the PLMN search, or the communication system information of the discovered PLMN when the PLMN is discovered according to the scanning result.

The communication unit 140 can include radio frequency receiver and transmitter and/or optical (e.g., infrared light) receiver and transmitter. The communication unit 140 can include a communication system for supporting any one of, but not limited to, a Global System for Mobile communication (GSM) network, an Enhanced Data GSM Environment (EDGE) network, a Code Division Multiple Access (CDMA) network, a W-CDMA network, a LTE network, an Orthogonal Frequency Division Multiple Access (OFDMA) network, a Wireless Fidelity (Wi-Fi) network, a Near Field Communication (NFC), IrDA, WiMax network and/or Bluetooth network. The communication system may support other networks. When the communication system discovers the PLMN, the communication unit 140 can access the corresponding communication system. Also, when a communication access request is detected, the communication unit 140 can scan the frequency band corresponding to the communication system for the PLMN search.

Figure 1B:
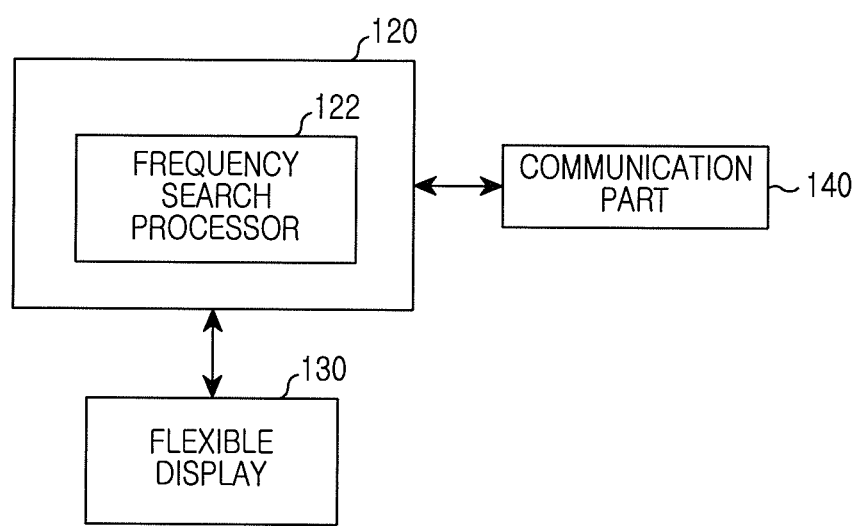
FIG. 1B illustrates a block diagram of a processor for searching for the PLMN according to an exemplary embodiment of the present disclosure.

FIG. 1B illustrates a block diagram of the processor for the PLMN search according to an exemplary embodiment of the present disclosure.

Referring to FIG. 1B, the processor includes a frequency search processor 122.

When the communication access event is detected, the frequency search processor 122 scans the frequency bands of the communication systems to the PLMN search. That is, the frequency search processor 122 scans the frequency bands corresponding to the communication systems for the communication access and determines whether the available PLMN is detected. For example, the frequency search processor 122 determines whether the available PLMN is detected by scanning the frequency band (900 MHz~1 GHz) of the LTE for the communication access. For example, the frequency search processor 122 determines whether the available PLMN is detected by scanning the frequency band (2.25 GHz~2.45 GHz) of the WCDMA for the communication access. For example, the frequency search processor 122 determines whether the available PLMN is detected by scanning the frequency band (890 MHz~940 MHz) of the GSM for the communication access. In so doing, based on the priority of the communication system, the frequency search processor 122 can sequentially scan the frequency bands from the high-priority communication system. The priority of the communication system can be preset at the design phase or determined and changed according the user setup. The priority of the communication system can be set and changed at the time of the access to the electronic device. For example, the highest priority can be given to the communication system most recently accessed by the electronic device.

When the communication access event is detected, the frequency search processor 122 first searches for the PLMN most recently accessed by the electronic device, that is, the RPLMN. For example, when the communication access event is detected, the frequency search processor 122 confirms that the PLMN most recently accessed by the electronic device is the first PLMN and searches for the first PLMN by sequentially scanning the frequency bands of the communication systems according to the priority.

The frequency search processor 122 scan the frequency band of the first communication system to search for the first PLMN, and determines the frequency band to scan in the second communication system according to the frequency band scan result of the first communication system.

When the frequency band of the first communication system is scanned to search for the first PLMN and the first PLMN is discovered, the frequency search processor 122 can access the communication. By contrast, when the frequency band of the first communication system is scanned to discover the first PLMN and the first PLMN is not discovered, the frequency search processor 122 can scan the frequency band of the second communication system according to the priority of the communication systems. When the frequency band of the first communication system is scanned and the second PLMN is discovered instead of the first PLMN, the frequency search processor 122 continues searching for the first PLMN in the other frequency band excluding the frequency band of the second PLMN discovered in the frequency band of the second communication system. Next, when the first PLMN is not discovered in the frequency band of the second communication system, the frequency search processor 122 repeats the above process. For example, when the frequency band (900 MHz~1 GHz) of the LTE is scanned to discover the first PLMN and the second PLMN is discovered in the frequency band 900 MHz~920 MHz, the frequency search processor 122 continues searching for the first PLMN in the other frequency band excluding the frequency band (900 MHz~920 MHz) of the second PLMN discovered in the frequency band (890 MHz~940 GHz) of the GSM. Herein, when the frequency band of the first communication system is scanned to discover the first PLMN and the second PLMN is discovered, the frequency search processor 122 excludes the frequency band of the second PLMN as scanning the frequency band of the second communication system in order to reduce the total scanning time by considering that different PLMNs do not use the same frequency band.

Figure 2A:
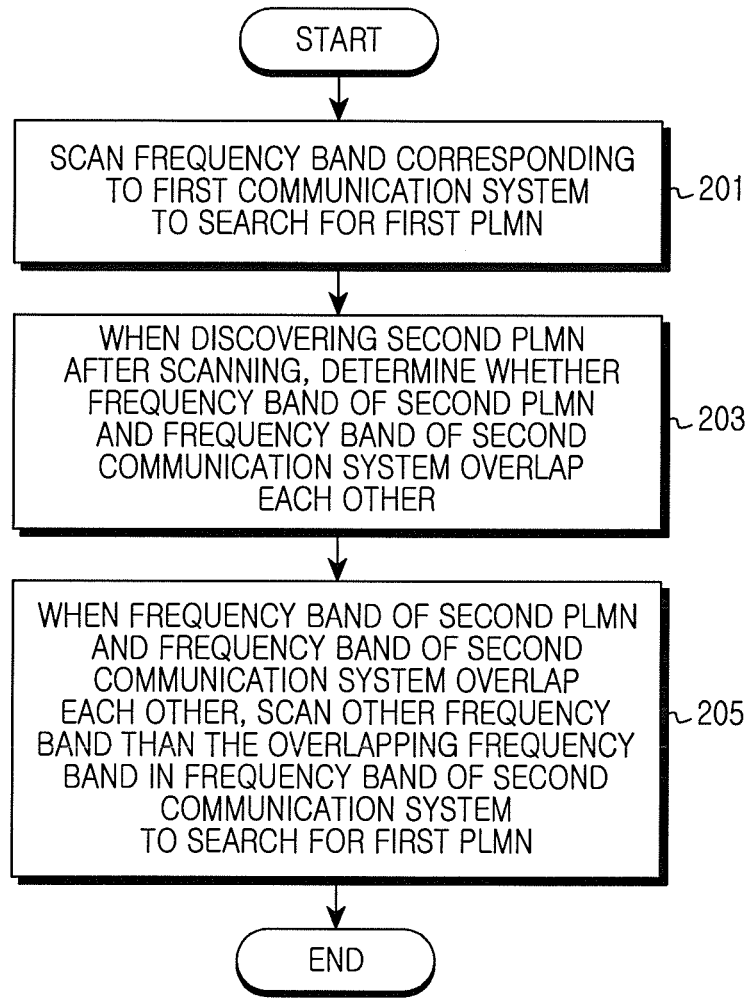
FIG. 2A illustrates a flowchart for a method for scanning a frequency band to search for the PLMN in the electronic device according to an exemplary embodiment of the present disclosure.

FIG. 2A illustrates a flowchart for a method for scanning the frequency band for the PLMN search in the electronic device 100 according to an exemplary embodiment of the present disclosure.

Referring to FIG. 2A, the electronic device 100 scans the frequency band corresponding to the first communication system to search for the first PLMN in step 201. The first communication system can include at least one of the LTE, the WCDMA, and the GSM, and the first PLMN can be the last PLMN registered in the electronic device 100.

In step 203, when discovering the second PLMN after scanning the frequency band corresponding to the first communication system, the electronic device 100 determines whether the frequency band of the second PLMN and the frequency band of the second communication system overlap each other. That is, when scanning the frequency band corresponding to the first communication system for the first PLMN search and discovering the second PLMN excluding the first PLMN, the electronic device 100 determines whether the frequency band of the second PLMN overlaps with the frequency band of the second communication system to be scanned.

In step 205, when the frequency band of the second PLMN and the frequency band of the second communication system overlap each other, the electronic device 100 scans the other frequency band than the overlapping frequency band in the frequency band of the second communication system for the first PLMN search. That is, when scanning the frequency band for the first PLMN search and discovering other PLMN than the first PLMN in a particular frequency band, the electronic device 100 continues scanning the first PLMN in the other frequency band than the frequency band of the other PLMN discovered.

Figure 2B:
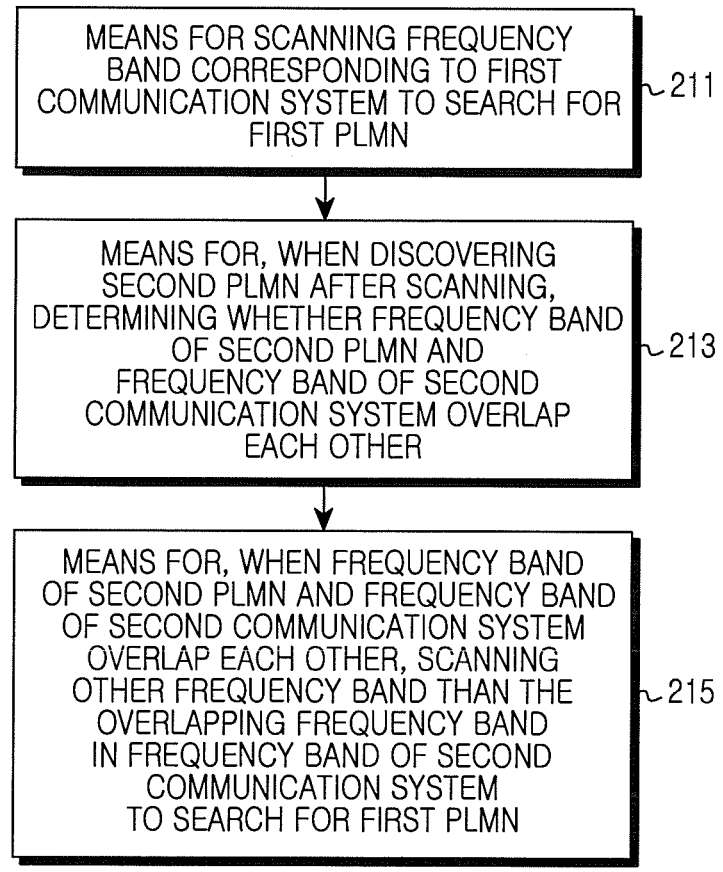
FIG. 2B illustrates a diagram of means for scanning the frequency band to search for the PLMN in the electronic device according to an exemplary embodiment of the present disclosure.

FIG. 2B illustrates means for scanning the frequency band to search for the PLMN in the electronic device 100 according to an exemplary embodiment of the present disclosure.

Referring to FIG. 2B, the electronic device 100 includes a means 211 for scanning the frequency band corresponding to the first communication system to search for the first PLMN. Particularly, the electronic device 100 supports two or more communication systems.

The electronic device 100 includes a means 213 for, when the second PLMN is discovered according to the scanning, determining whether the frequency band of the second PLMN and the frequency band of the second communication system overlap each other. In so doing, when discovering a particular PLMN, the electronic device 100 includes a means for checking the frequency band of the discovered PLMN.

The electronic device 100 includes a means 215 for, when the frequency band of the second PLMN and the frequency band of the second communication system overlap each other, scanning the other frequency band than the overlapping frequency band in the frequency band of the second communication system to search for the first PLMN.

Figure 3A:
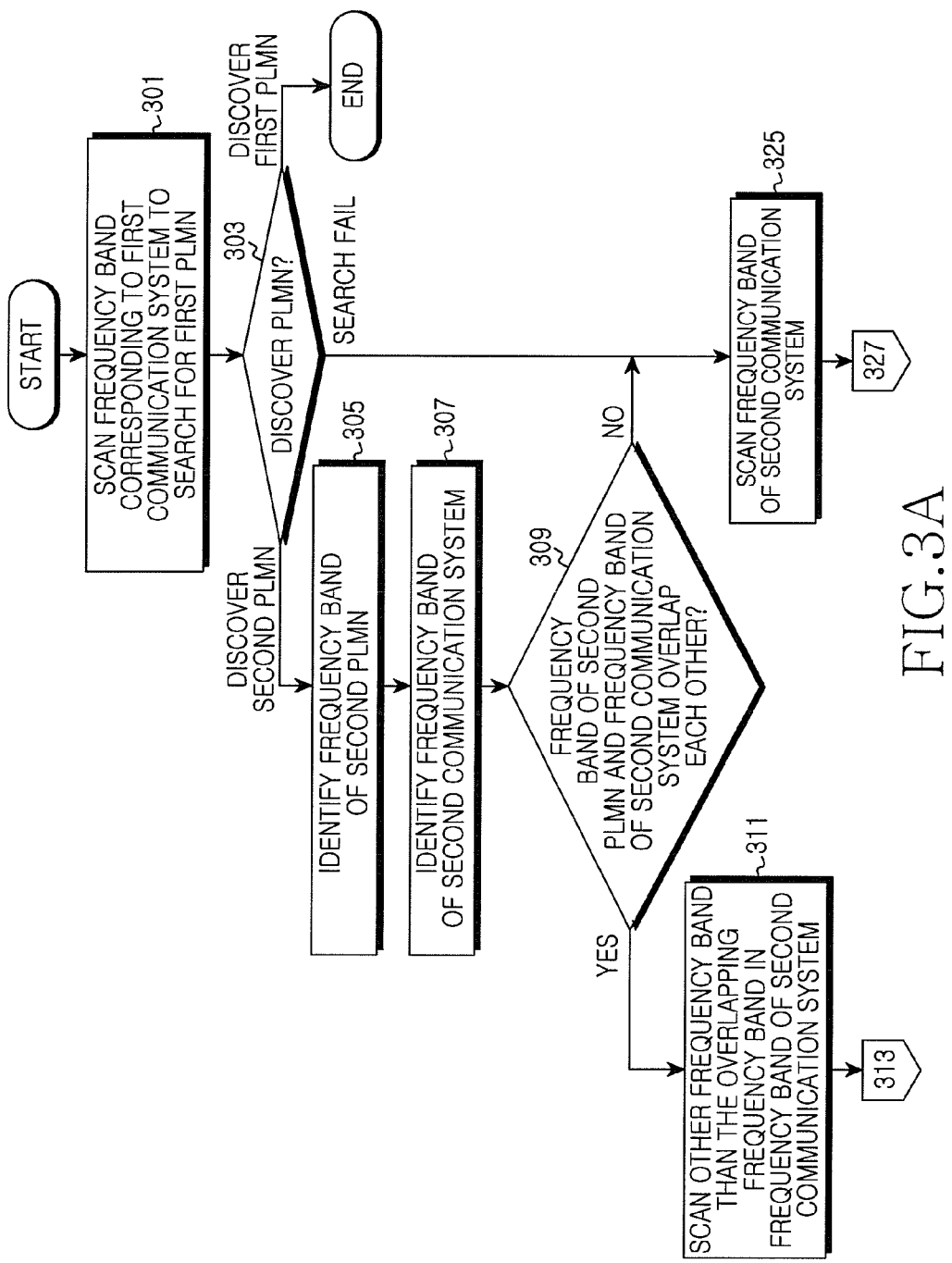
FIGS. 3A and 3B illustrate a flowchart of a method for searching for a first PLMN in the electronic device supporting three communication systems according to an exemplary embodiment of the present disclosure.
Figure 3B:
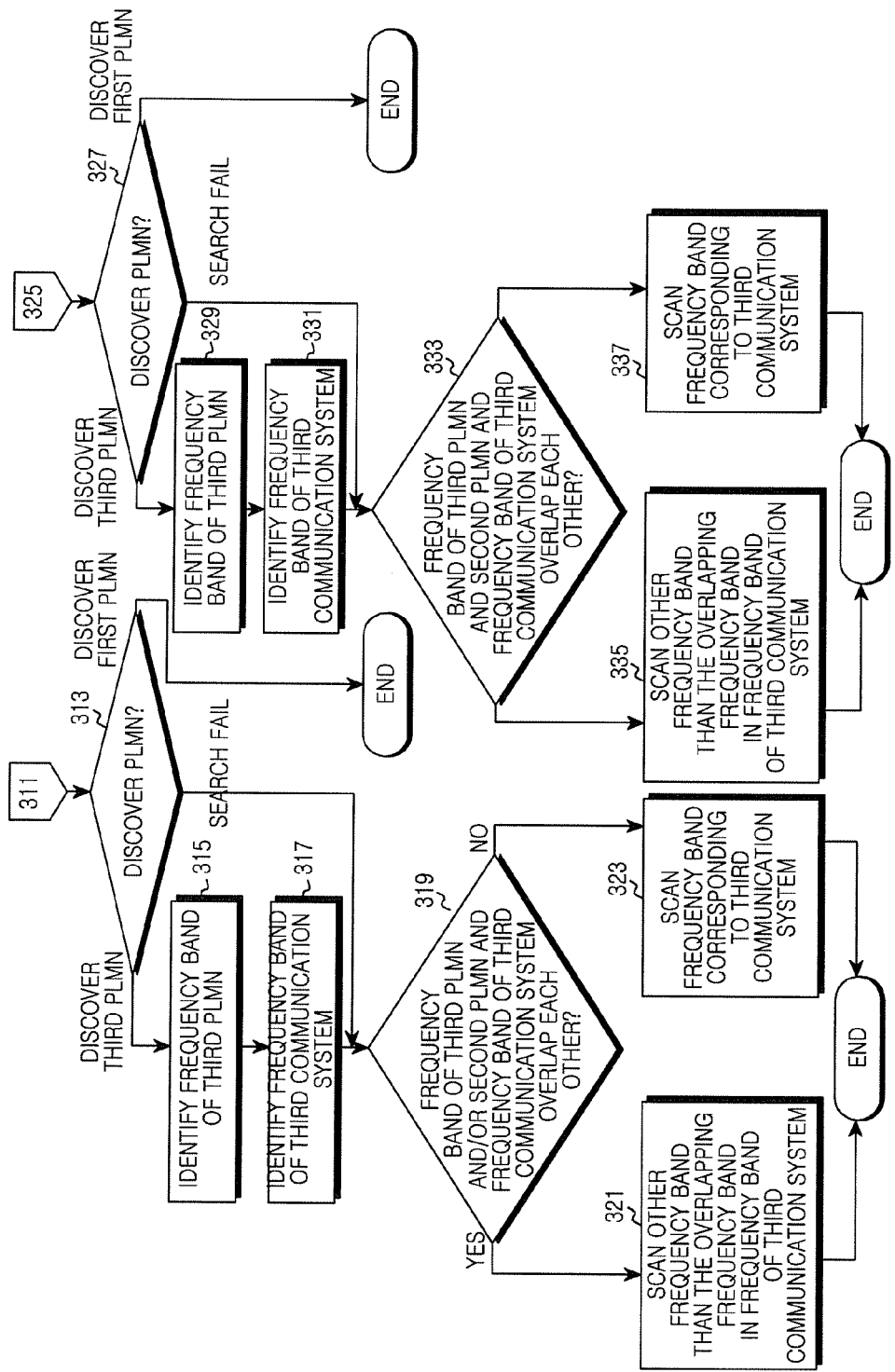

FIGS. 3A and 3B illustrate a flowchart of a method for searching for the first PLMN in the electronic device 100 supporting three communication systems according to an exemplary embodiment of the present disclosure.

Referring to FIG. 3A, the electronic device 100 scans the frequency band corresponding to the first communication system to search for the first PLMN in step 301, and determine whether the PLMN is discovered in step 303. The first PLMN can be the last PLMN registered in the electronic device 100.

Upon discovering the first PLMN, the electronic device 100 accesses the first PLMN using a communication scheme corresponding to the first communication system and then finishes this process. In so doing, the electronic device 100 can fulfill the communication by receiving a communication service from the first PLMN.

By contrast, when discovering the second PLMN, the electronic device 100 identifies the frequency band of the second PLMN in step 305 and identifies the frequency band of the second communication system in step 307. That is, when discovering the second PLMN rather than the first PLMN after scanning the frequency band corresponding to the first communication system to search for the first PLMN, the electronic device 100 identifies the frequency band of the discovered second PLMN and the frequency band of the second communication system.

In step 309, the electronic device 100 determines whether the frequency band of the second PLMN and the frequency band of the second communication system overlap each other.

When the frequency band of the second PLMN and the frequency band of the second communication system overlap each other, the electronic device 100 scans the other frequency band than the overlapping frequency band in the frequency band of the second communication system in step 311. For example, when the frequency band of the second PLMN is 900 MHz~920 MHz and the frequency band of the second communication system is 800 MHz~920 MHz, the electronic device 100 excludes 900 MHz~920 MHz from the frequency band 800 MHz~920 MHz and scans the remaining 800 MHz~900 MHz.

In step 313, the electronic device searches for the PLMN.

When discovering the first PLMN in the frequency band of the second communication system in step 313, the electronic device 100 accesses the first PLMN using a communication scheme corresponding to the second communication system and then finishes this process. In so doing, the electronic device 100 can fulfill the communication by receiving the communication service from the first PLMN.

When discovering the third PLMN in the frequency band of the second communication system in step 313, the electronic device 100 identifies the frequency band of the third PLMN in step 315 and identifies the frequency band of the third communication system in step 317. That is, when discovering the third PLMN rather than the first PLMN after scanning the frequency band corresponding to the second communication system to search for the first PLMN, the electronic device 100 identifies the frequency band of the discovered third PLMN and the frequency band of the third communication system.

In step 319, the electronic device 100 determines whether the frequency band of the third PLMN discovered in the previous scanning and/or the second PLMN overlaps with the frequency band of the third communication system.

When the frequency band of the third PLMN and/or the second PLMN and the frequency band of the third communication system overlap each other, the electronic device 100 scans the other frequency band than the overlapping frequency band in the frequency band of the third communication system in step 321. For example, when the frequency band of the third PLMN is 900 MHz~920 MHz and the frequency band of the third communication system is 800 MHz~920 MHz, the electronic device 100 excludes 900 MHz~920 MHz from the frequency band 800 MHz~920 MHz and scans the remaining 800 MHz~900 MHz. For example, when the frequency band of the third PLMN is 900 MHz~920 MHz, the frequency band of the second PLMN is 880 MHz~900 MHz, and the frequency band of the third communication system is 800 MHz~920 MHz, the electronic device 100 excludes 900 MHz~920 MHz and 880 MHz~900 MHz from the frequency band 800 MHz~920 MHz and scans the remaining 800 MHz~880 MHz. Next, the electronic device 100 finishes this process.

By contrast, when the frequency band of the third PLMN and/or the second PLMN and the frequency band of the third communication system do not overlap each other, the electronic device 100 scans the entire frequency band corresponding to the third communication system in step 323. Next, the electronic device 100 finishes this process.

When the PLMN search fails in step 303 or when the frequency band of the second PLMN and the frequency band of the second communication system do not overlap each other in step 309, the electronic device 100 can scan the entire frequency band corresponding to the second communication system in step 325.

In step 327, the electronic device 100 determines whether the PLMN is discovered.

When discovering the first PLMN in the frequency band of the second communication system in step 327, the electronic device 100 accesses the first PLMN using the communication scheme corresponding to the second communication system and then finishes this process. In so doing, the electronic device 100 can fulfill the communication by receiving the communication service from the first PLMN.

When discovering the third PLMN in the frequency band of the second communication system in step 327, the electronic device 100 identifies the frequency band of the third PLMN in step 329 and identifies the frequency band of the third communication system in step 331. That is, when discovering the third PLMN rather than the first PLMN after scanning the frequency band corresponding to the second communication system to search for the first PLMN, the electronic device 100 identifies the frequency band of the third PLMN and the frequency band of the third communication system.

In step 333, the electronic device 100 determines whether the frequency band of the third PLMN discovered in the previous scanning and/or the second PLMN overlaps with the frequency band of the third communication system.

When the frequency band of the third PLMN and/or the second PLMN and the frequency band of the third communication system overlap each other in step 333, the electronic device 100 scans the other frequency band than the overlapping frequency band in the frequency band of the third communication system in step 335. For example, when the frequency band of the third PLMN is 900 MHz~920 MHz and the frequency band of the third communication system is 800 MHz~920 MHz, the electronic device 100 scans the frequency band 800 MHz~900 MHz excluding 900 MHz~920 MHz from the frequency band 800 MHz~920 MHz. For example, when the frequency band of the third PLMN is 900 MHz~920 MHz, the frequency band of the second PLMN is 880 MHz~900 MHz, and the frequency band of the third communication system is 800 MHz~920 MHz, the electronic device 100 scans the frequency band 800 MHz~880 MHz excluding 900 MHz~920 MHz and 880 MHz~900 MHz from the frequency band 800 MHz~920 MHz. Next, the electronic device 100 finishes this process.

By contrast, when the frequency band of the third PLMN and/or the second PLMN and the frequency band of the third communication system do not overlap each other in step 333, the electronic device 100 scans the entire frequency band corresponding to the third communication system in step 337. Next, the electronic device 100 finishes this process.

FIG. 4 illustrates the frequency band scanning per communication system for the BPLMN search in the electronic device 100 according to an exemplary embodiment of the present disclosure.

Referring to FIG. 4, the electronic device 100 supports three communication systems LTE, WCDMA, and GSM. The frequency band of the LTE supported by the electronic device 100 is 900 MHz~1 GHz, the frequency band of the WCDMA is 2.024 G~2.45 GHz, and the frequency band of the GSM is 890 MHz~940 MHz.

Assumed that the last PLMN registered in the electronic device 100 is a B PLMN, the electronic device 100 scans the frequency band of the LTE being the first communication system for the B PLMN search. In so doing, the electronic device 100 can discover an A PLMN in the frequency band of the LTE and confirm that the frequency band of the A PLMN is 905 MHz~950 MHz.

Next, the electronic device 100 can scan the frequency band of the WCDMA being the second communication system for the B PLMN search. The electronic device 100 confirms that the LTE frequency band of the discovered A PLMN and the frequency band of the WCDMA do not overlap each other, and then scans the entire frequency band of the WCDMA. The electronic device 100 can discover the A PLMN as a result of the scanning of the WCDMA and confirm that the frequency band of the A PLMN is 2.3 GHz~2.4 GHz.

Next, the electronic device 100 can scan the GSM frequency band of the third communication system for the B PLMN search. In so doing, the electronic device 100 confirms that the LTE frequency band of the discovered A PLMN overlaps with the GSM frequency band and then scans the frequency band 890 MHz~905 MHz excluding the overlapping frequency band 905 MHz~940 MHz from the GSM frequency band 890 MHz~940 MHz. The electronic device 100 can discover the A PLMN as a result of the GSM scanning, and confirm that the frequency band of the A PLMN is 890 MHz~895 MHz.

Figure 5:
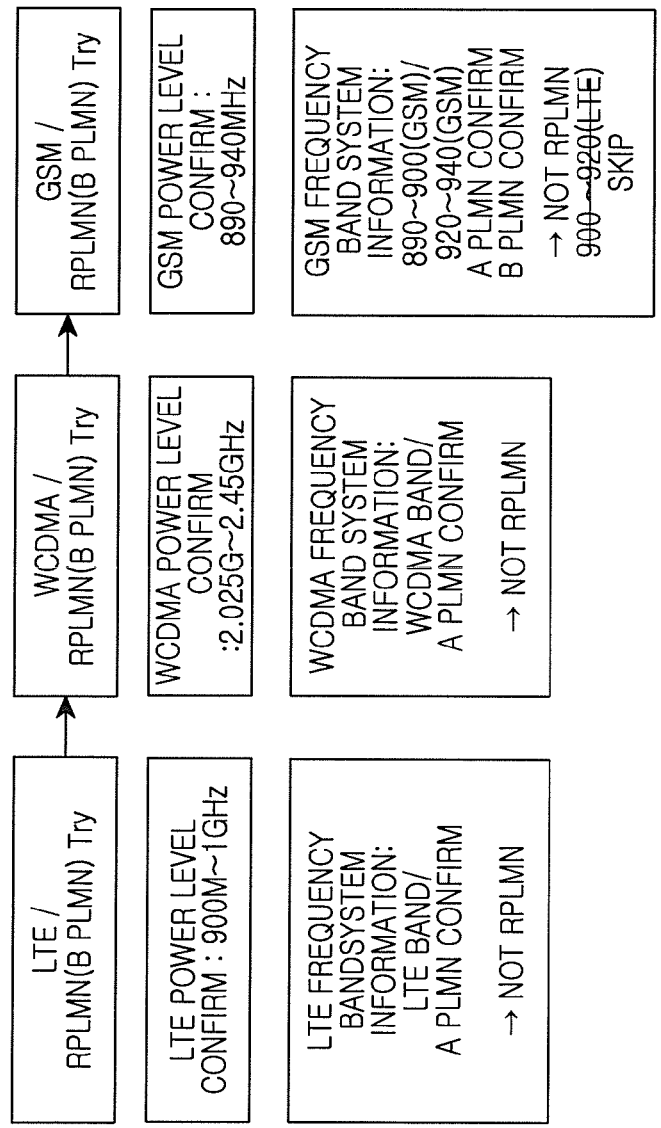
FIG. 5 illustrates a diagram of B PLMN search in the electronic device supporting three communication systems according to an exemplary embodiment of the present disclosure.

FIG. 5 illustrates the B PLMN search in the electronic device 100 supporting three communication systems according to an exemplary embodiment of the present disclosure.

Referring to FIG. 5, to search for the B PLMN being the RPLMN in the LTE, the electronic device 100 scans the LTE frequency band 900 MHz~1 GHz. In so doing, the electronic device 100 can discover the A PLMN in the LTE frequency band and does not discover the B PLMN.

Next, to keep searching for the B PLMN being the RPLMN in the WCDMA, the electronic device 100 scans the WCDMA frequency band 2.025 GHz~2.45 GHz. In so doing, the electronic device 100 can discover the A PLMN in the WCDMA frequency band and does not discover the B PLMN.

Next, to continue searching for the B PLMN being the RPLMN in the GSM, the electronic device 100 scans the GSM frequency band 890 MHz~940 MHz. In so doing, the electronic device 100 can discover the A PLMN and the B PLMN by scanning the frequency bands 890 MHz~900 MHz and 920 MHz~940 MHz excluding the frequency band of the discovered A PLMN as a result of the scanning results of the LTE and WCDMA frequency bands. In this case, the electronic device 100 can save the scanning time because the electronic device 100 does not scan the GSM frequency band 900 MHz~920 MHz. For example, when the electronic device 100 scans the frequency band based on 200 KHz and the single scanning takes 0.15 seconds, the electronic device 100 can save the scanning time of 15 seconds in total because the electronic device 100 does not scan the overlapping frequency band 20 MHz in the GSM scanning.

The exemplary embodiments and various functional operations of the present disclosure described herein can be implemented in computer software, firmware, hardware, or in combinations of one or more of them including the structures disclosed in this specification and their structural equivalents. The exemplary embodiments of the present disclosure can be implemented as one or more computer program products, that is, one or more data processors, or one or more modules of computer program instructions encoded on a computer-readable medium to control the devices.

The computer-readable medium may be a machine-readable storage medium, a machine-readable storage substrate, a memory device, a material affecting a machine-readable propagated stream, or a combination of one or more of these. The term 'data processor' encompasses every device, apparatus, and machine including, for example, a programmable processor, a computer, a multiple processors, or a computer, for processing data. The device can be added to the hardware and include a program code for creating an execution environment of a corresponding computer program, for example, a code for constituting processor firmware, a protocol stack, a database management system, an operating system, or a combination of one or more of these.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for network search by an electronic device, the method comprising:
scanning a first frequency band corresponding to a first communication system among a plurality of communication systems supported by the electronic device to search for a first Public Land Mobile Network (PLMN);
in response to discovering a second PLMN in the first frequency band as a result of the scanning, determining whether a frequency band of the second PLMN and a second frequency band of a second communication system overlap each other;
in response to determining that the frequency band of the second PLMN and the second frequency band of the second communication system overlap each other, scanning another frequency band excluding the overlapped second frequency band in an entire frequency band corresponding to the second communication system to search for the first PLMN;
if the first PLMN is discovered in the first frequency band corresponding to the first communication system, displaying a first information notifying that the first PLMN is discovered in the first communication system; and
if the first PLMN is discovered in the second frequency band corresponding to the second communication system, displaying a second information notifying that the first PLMN is discovered in the second communication system.

2. The method of claim 1, further comprising:
in response to discovering the first PLMN as a result of the first frequency band scanning corresponding to the first communication system, accessing the first PLMN based on the first communication system.

3. The method of claim 1, further comprising:
in response to discovering the first PLMN in the other frequency band excluding the overlapped second frequency band as a result of the other frequency band scanning, accessing the first PLMN based on the second communication system.

4. The method of claim 1, further comprising:
in response to determining that the frequency band of the second PLMN and the second frequency band of the second communication system do not overlap each other, scanning the entire frequency band of the second communication system to search for the first PLMN.

5. The method of claim 1, further comprising:
in response to discovering a third PLMN in the other frequency band excluding the overlapped second frequency band by scanning the other frequency band, determining whether the frequency band of the second PLMN and the third PLMN and a third frequency band of the third communication system overlap each other; and
in response to determining that the frequency band of the second PLMN and the third PLMN and the third frequency band of the third communication system overlap each other, scanning another frequency band excluding the overlapped third frequency band in an entire frequency band corresponding to the third communication system to search for the first PLMN.

6. The method of claim 5, further comprising:
in response to determining that the frequency band of the second PLMN and the third PLMN and the third frequency band of the third communication system do not overlap each other, scanning the entire frequency band of the third communication system to search for the first PLMN.

7. The method of claim 1, wherein the first communication system is one of Long Term Evolution (LTE), Wideband Code Division Multiple Access (WCDMA), or Global System for Mobile Communications (GSM).

8. The method of claim 1, wherein the first PLMN is a last PLMN registered in the electronic device.

9. An electronic device for network search, the electronic device comprising:
one or more processors;
a touch-sensitive display;
a communication unit configured to communicate with two or more communication systems; and
a memory configured to store one or more programs, wherein the one or more processors are configured to execute program code of the one or more programs to:
cause the communication unit to scan a first frequency band corresponding to a first communication system among a plurality of communication systems supported by the electronic device to search for a first Public Land Mobile Network (PLMN);
determine, in response to discovering a second PLMN in the first frequency band as a result of the scanning, whether a second frequency band of the second PLMN and a frequency band of a second communication system overlap each other; and
cause the communication unit to scan, in response to determining that the frequency band of the second PLMN and the second frequency band of the second communication system overlap each other, another frequency band excluding the overlapped second frequency band in an entire frequency band corresponding to the second communication system to search for the first PLMN
if the first PLMN is discovered in the first frequency band corresponding to the first communication system, cause the touch-sensitive display to display a first information notifying that the first PLMN is discovered in the first communication system; and
if the first PLMN is discovered in the second frequency band corresponding to the second communication system, cause the touch-sensitive display to display a second information notifying that the first PLMN is discovered in the second communication system.

10. The electronic device of claim 9, wherein the one or more processors are configured to cause the communication unit to access, in response to discovering the first PLMN as a result of the frequency band scanning corresponding to the first communication system, the first PLMN based on the first communication system.

11. The electronic device of claim 9, wherein the one or more processors are configured to cause the communication unit to access, in response to discovering the first PLMN in the other frequency band excluding the overlapped second frequency band as a result of the other frequency band scanning, the first PLMN based on the second communication system.

12. The electronic device of claim 9, wherein the one or more processors are configured to cause the communication unit to scan, in response to determining that the frequency band of the second PLMN and the second frequency band of the second communication system do not overlap each other, the entire frequency band of the second communication system to search for the first PLMN.

13. The electronic device of claim 9, wherein the one or more processors are configured to:
 determine, in response to discovering a third PLMN in the other frequency band excluding the overlapped second frequency band by scanning the other frequency band, whether the frequency band of the second PLMN and the third PLMN and a third frequency band of the third communication system overlap each other; and
 cause the communication unit to scan, in response to determining that the frequency band of the second PLMN and the third PLMN and the third frequency band of the third communication system overlap each other, the other frequency band excluding the overlapped third frequency band in an entire frequency band corresponding to the third communication system to search for the first PLMN.

14. The electronic device of claim 13, wherein the one or more processors are configured to cause the communication unit to scan, in response to determining that the frequency band of the second PLMN and the third PLMN and the third frequency band of the third communication system do not overlap each other, an entire frequency band of the third communication system to search for the first PLMN.

15. The electronic device of claim 9, wherein the first communication system is one of Long Term Evolution (LTE), Wideband Code Division Multiple Access (WCDMA), or Global System for Mobile Communications (GSM).

16. The electronic device of claim 9, wherein the first PLMN is the last PLMN registered in the electronic device.

17. A non-transitory computer-readable storage medium storing one or more programs for network search, the one or more programs comprising program code for:
 instructing scanning of a first frequency band corresponding to a first communication system among a plurality of communication systems supported by the electronic device to search for a first Public Land Mobile Network (PLMN);
 determining, in response to discovering a second PLMN in the first frequency band as a result of the scanning, whether a frequency band of the second PLMN and a second frequency band of a second communication system overlap each other;
 instructing, in response to determining that the frequency band of the second PLMN and the second frequency band of the second communication system overlap each other, scanning of another frequency band excluding the overlapped second frequency band in an entire frequency band corresponding to the second communication system to search for the first PLMN;
 if the first PLMN is discovered in the first frequency band corresponding to the first communication system, instructing displaying of a first information notifying that the first PLMN is discovered in the first communication system; and
 if the first PLMN is discovered in the second frequency band corresponding to the second communication system, instructing displaying of a second information notifying that the first PLMN is discovered in the second communication system.

18. The computer-readable storage medium of claim 17, further comprising program code for:
 accessing, in response to discovering the first PLMN as a result of the frequency band scanning corresponding to the first communication system, the first PLMN based on the first communication system.

19. The computer-readable storage medium of claim 17, further comprising program code for:
 accessing, in response to discovering the first PLMN in the other frequency band excluding the overlapped second frequency band as a result of the other frequency band scanning, the first PLMN based on the second communication system.

20. The computer-readable storage medium of claim 17, further comprising program code for:
 instructing, in response to determining that the frequency band of the second PLMN and the second frequency band of the second communication system do not overlap each other, scanning of the entire frequency band of the second communication system to search for the first PLMN.

* * * * *